(12) United States Patent
Colby

(10) Patent No.: US 10,996,021 B2
(45) Date of Patent: May 4, 2021

(54) AIR-POWERED SHOT DEVICE AND COMPONENTS FOR DISABLING A HARD-BODY INSECT

(71) Applicant: Calvin Kittridge Colby, Eagle, ID (US)

(72) Inventor: Calvin Kittridge Colby, Eagle, ID (US)

( * ) Notice: Subject to any disclaimer, the term of this patent is extended or adjusted under 35 U.S.C. 154(b) by 0 days.

(21) Appl. No.: 16/874,481

(22) Filed: May 14, 2020

(65) Prior Publication Data

US 2020/0363157 A1    Nov. 19, 2020

Related U.S. Application Data

(60) Provisional application No. 62/847,777, filed on May 14, 2019.

(51) Int. Cl.
*F41B 11/54* (2013.01)
*A01M 27/00* (2006.01)
*F41B 11/80* (2013.01)

(52) U.S. Cl.
CPC ............ *F41B 11/54* (2013.01); *A01M 27/00* (2013.01); *F41B 11/80* (2013.01); *A01M 2200/01* (2013.01)

(58) Field of Classification Search
CPC ...... F41B 11/54; F41B 11/55; F41B 11/80–81; A01M 27/00
See application file for complete search history.

(56) References Cited

U.S. PATENT DOCUMENTS

| | | | |
|---|---|---|---|
| 4,004,565 A * | 1/1977 | Fischer | A61M 37/0069 124/45 |
| 4,760,834 A * | 8/1988 | Chevalier | F41A 9/25 124/51.1 |
| 4,986,251 A * | 1/1991 | Lilley | F41B 11/54 124/48 |
| 9,664,475 B1 * | 5/2017 | Maggiore | F41B 11/81 |
| 10,605,562 B2 * | 3/2020 | DiBlasio | F41B 11/55 |
| 2017/0268848 A1 * | 9/2017 | Wei | F41B 11/56 |
| 2020/0263950 A1 * | 8/2020 | Call | F41B 11/54 |

* cited by examiner

*Primary Examiner* — Joshua T Semick
(74) *Attorney, Agent, or Firm* — Colby Nipper PLLC

(57) ABSTRACT

This document describes techniques and devices capable of disabling or killing hard-bodied insects, including wasps and hornets, to two, three, or even four or more feet. In some cases, the techniques and devices use an existing pressurized-air device, such as a CO2-powered rifle or pistol, either intended for BBs or pellets, in .177, .20, .22, .25 and so forth calibers. Other pressurized-air devices can also be used, such a PCP (pre-charged pneumatic), spring, gas piston, single and multi-pump pneumatic, electric-motor-powered spring-piston, and similar pressurized-air devices.

17 Claims, 3 Drawing Sheets

AIR-POWERED SHOT DEVICE AND COMPONENTS FOR DISABLING A HARD-BODY INSECT

RELATED APPLICATIONS

This application claims priority to U.S. Provisional Patent Application No. 62/847,777, filed May 14, 2019, the disclosure of which is incorporated by reference herein in its entirety.

BACKGROUND

Current air-based salt-shooting systems include the A-Salt Gun™, which uses a spring to pressurize air. This pressurized air is then used to push small-grain salt (e.g., table salt) at moderate velocities. This solution, however, works only marginally for flies and other soft-bodied insects, but it does very poorly for hard-bodied insects, such as wasps and hornets.

SUMMARY

In contrast to many current systems, the techniques and devices disclosed herein are capable of disabling or killing hard-bodied insects, including wasps and hornets, from two, three, or even four or more feet. In some cases, the solution uses an existing pressurized-air weapon, such as a CO2-powered rifle or pistol, either intended for BBs or pellets, in .177, .20, .22, .25 and so forth calibers. Other pressurized-air devices can also be used, such a PCP (pre-charged pneumatic), spring, gas piston, single and multi-pump pneumatic, electric-motor-powered spring-piston, and similar air-powered devices (also called pressurized-air devices).

DETAILED DESCRIPTION

Overview

Many current systems for killing or disabling insect pests are ineffective against hard-body insects. Even firing from only two inches away, the A-Salt Gun™ is often unable to kill or disable a wasp. Furthermore, some wasps and hornets are especially dangerous to people, animals, and honeybee populations, such as the Asian giant hornet, or *Vespa mandarinia*. This hornet has recently become an invasive species in North America, causing concern that native honeybees, which do not appear to have a defense to this species, are in danger. This danger to native honeybees is a serious concern also due to the honeybee's important contribution to agriculture and food production. Furthermore, this species of giant hornet routinely kills humans, accounting for numerous deaths every year in Japan.

Example Shot Cylinder

Figure 1:
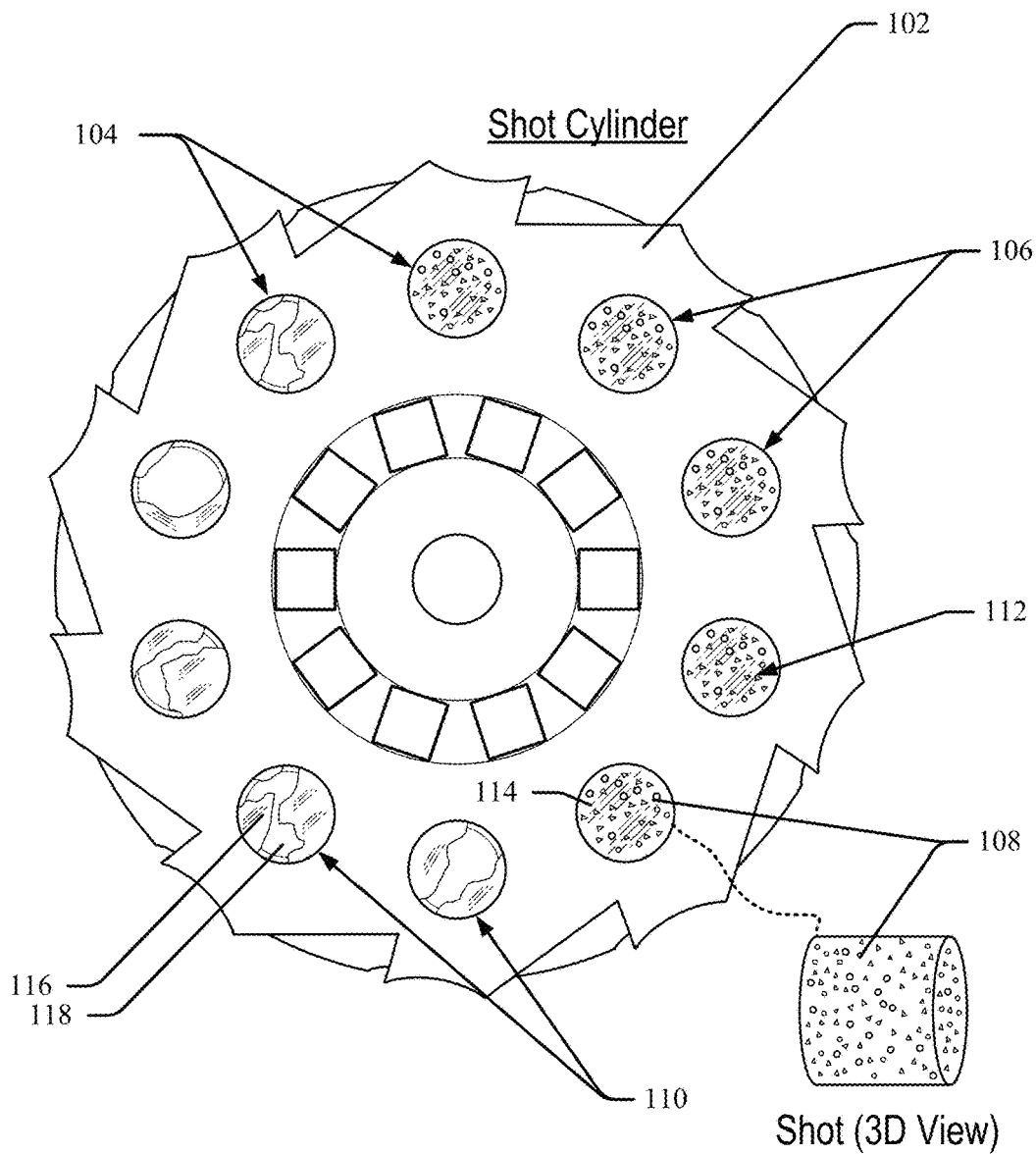
FIG. 1 illustrates a shot cylinder for use with a repeating pressurized-air device.
Figure 1:
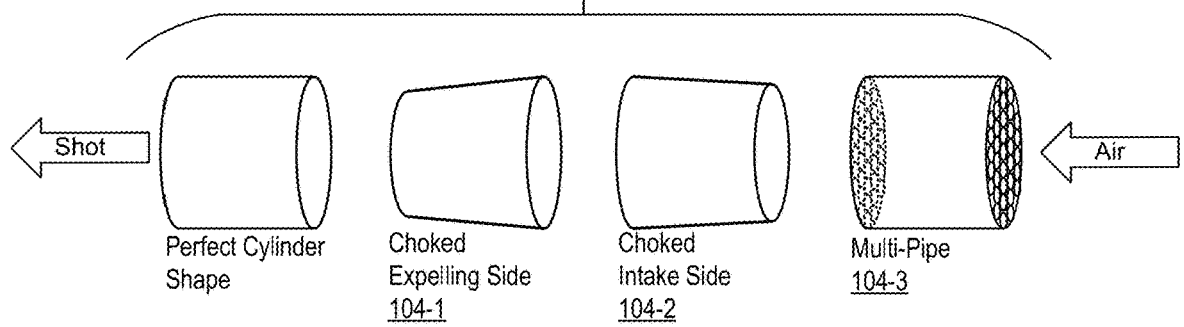

An example is shown in FIG. 1, which illustrate a shot cylinder 102 having chambers 104 filled (or previously filled) with multiple projectiles (aka "shot"), such as small steel or tungsten shot (e.g., size 9 and smaller, or 2.5 mm and smaller, 1.5 mm, 1 mm, 0.5 mm), Kosher salt or sea salt (e.g., 0.6 to 1.4 mm), sand, or similar small-sized projectiles. Shot-filled chambers 106 are illustrated with shot 108 (one view shown in 3D for clarity), as well as chambers that have been used and thus are devoid of shot, illustrated at empty chambers 110. At 112, each side of each of the cylinders (one side shown) includes a retention member 112 (e.g., membrane) through which pressurized air can pass or that ruptures when subject to pressurized air (air here includes ambient air or CO2, etc.), but that retains the projectiles (e.g., the shot 108) within the chambers 104 when not subject to pressurized air (the shot 108 being retained between the retention members 112). Pressurized air includes air that is of sufficient pressure to cause projectiles to exit a barrel between 200 feet per second and 2,000 feet per second (with other ranges contemplated, such as 400 to 950 feet per second or 500 to 800 feet per second). These retention members 112 may differ on each side, such as on a pressurized air intake side (the air-intake region) having a mesh through which the pressurized air may pass, but that retains the shot 108, with another side through which the shot 108 may easily pass through (the projectile ejection region) when subject to pressurized air from the opposite side (the air-intake region) of the chamber, such as a thin plastic or paper membrane, for example. A membrane example is illustrated, with each of the shot-filled chambers 106 having a membrane 114 that is not ruptured and the empty chambers 110 showing the ruptured membrane 116 along with a gap 118 through which the shot 108 passed.

In more detail, this retention member 112 can be punctured by the pressurized air, such as cellophane or thin tape, paper, or similar structure, or a mesh through which the air can pass even if the mesh itself is not punctured (on the air intake side).

The entire cylinder 102 can be made to be disposable, e.g., made of a combination of plastic, paper, and so forth, and thus sold to be used but not reused. This cylinder 102 also can be entirely safe to handle and store, as it may contain no dangerous materials. This has substantial benefits, as many current shot-based solutions, such as those for gun-powder-operated weapons, e.g., shotguns, require expensive cartridges that contain numerous expensive and/or dangerous components, such as nitrocellulose propellant (and other forms of smokeless propellant), lead projectiles, and primers (explosive "caps" used to ignite the explosive propellant).

Furthermore, the cylinder 102, because it does not require use of a self-contained and self-explosive shot-shell common throughout the world, can have various design alternatives (e.g., chamber alternatives 104-1, 104-2, and 104-3). Examples include chambers that are not perfect cylinders, thereby enabling shot-spread pattern differences, pressurized-air-flow differences across the chamber 104, and flexibility of design in the pressurized-air device, such as a lower-level of precision in the chamber lock-up and barrel alignment due to an ejection side that is smaller than the barrel diameter and/or the intake side.

For example, the chamber alternative 104-3 permits a substantial amount of play or inaccuracy in a chamber-to-barrel lineup. Further, the shot cylinder 102 can include larger cylinders than the barrel intake, or even include a shot cylinder that is without a single discrete chamber, thereby allowing any line-up so long as the pressurized air is expelled fairly close in-line with the barrel (see FIG. 2). As the cylinder can be designed without requiring a high degree of accuracy in line-up of each chamber 104 with the barrel and pressurized air provider, the precision, and thus the cost, of the shot cylinders 102 and 202 (and rectangle 220), can be reduced. Further, for many pressurized-air devices, such as pellet guns, the barrel intake and the pressurized air provider do not require moving parts to maintain alignment, and thus are inexpensive, while imprecision in the cylinder alignment has moving parts, and thus imprecision in conventional cases can be more difficult to maintain. With the shot cylinders 102 and 202 having designs that permit imprecision, not only is cost potentially reduced but even consideration of differences in barrel intake or overall barrel size (e.g., .177, .20, .22, or .25 caliber) can potentially be ignored. By so doing, disposable (or even non-disposable) shot cylinders described herein can be used even by pressurized-air devices having different barrel sizes, pressurized-air providers, and so forth.

Example Alignment-Insensitive Structures

Figure 2:
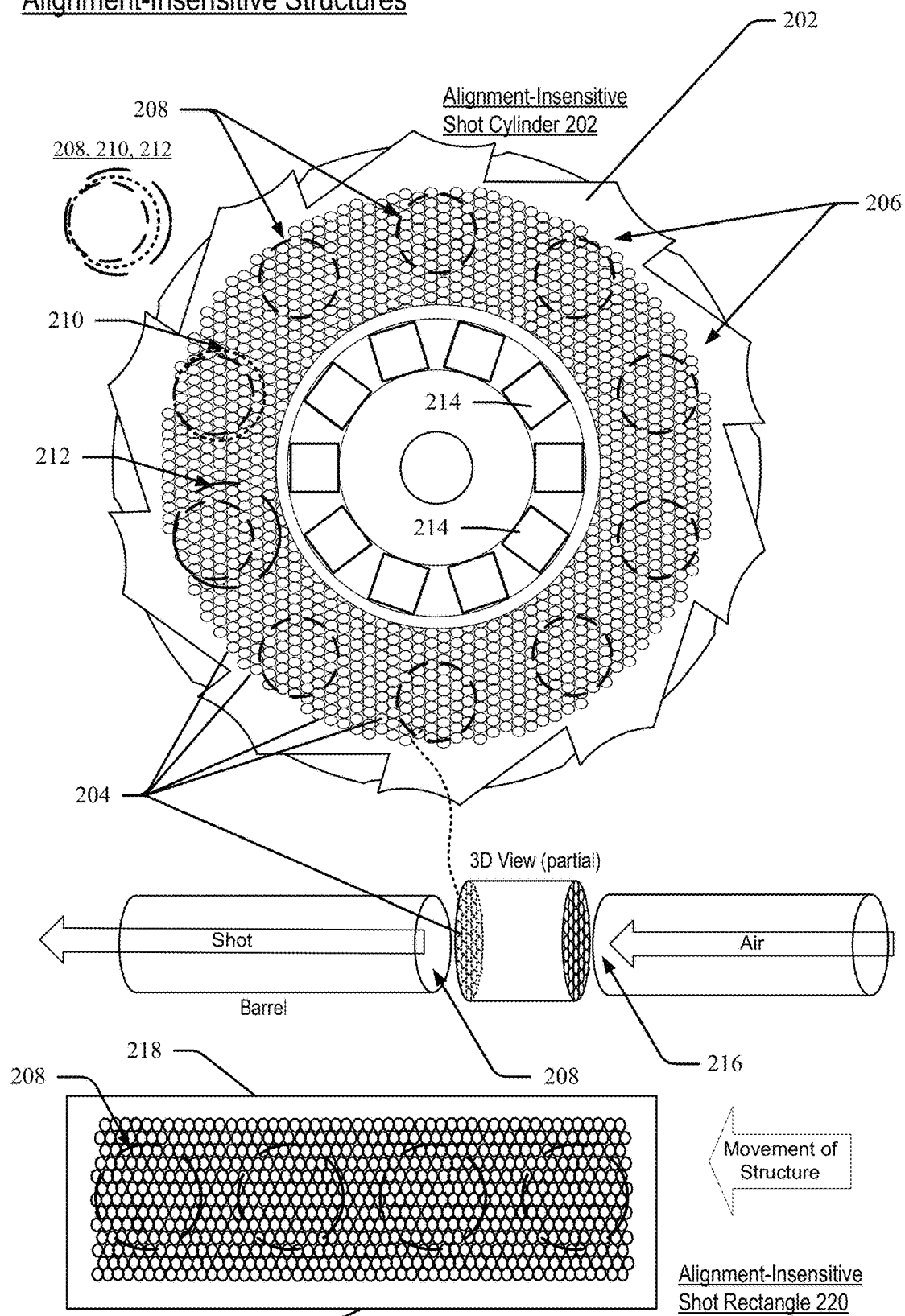
FIG. 2 illustrates alternative, alignment-insensitive shot structures for use with a repeating pressurized-air device.

One alternative shot cylinder is illustrated in FIG. 2, at alignment-insensitive shot cylinder 202. Note that even with poor alignment, unknown barrel caliber (diameter), and so forth, the alignment-insensitive shot cylinder 202 can be used. Further, if the size of the pipes 204 of the multi-pipe region 206 are selected to be slightly larger (or nearly the same) than the size of the shot, the shot can be selected with some consistency of size and stacked one-over-the-other in each of the pipes 204. Further, if the pipes or shot are somewhat flexible, the shot can be stacked within the pipes 204 under force and then retained without use of a membrane (e.g., the retention member 112) so long as the retention can be overcome by the force of the pressurized air. This stacking can permit additional consistency of shot pattern on the target.

Note the size of the barrel intakes 208 (or pressurized air intake region 216 from the other side, if same sized) superimposed in dashed line over the multi-pipe region 206. As shown, many, many pipes can be used for a single intake (and thus use when air is applied), such as a 12-pipe cross-section for a 6 millimeter barrel intake assuming each pipe has a 0.5 mm cross section (about 100 pipes in total). Thus, there are at least three or more of the multiple pipes being smaller in combined cross-section than a diameter of a barrel of the repeating pressurized-air device in which the multiple projectiles are intended to be ejected.

Note also the alternative barrel intakes 210 and 212, which are larger but still can be used with the same alignment-insensitive shot cylinder 202 or other structure. As noted, this can reduce costs by allowing more-universal use of a cylinder, and also allowing greater imprecision which, for some materials, is very likely to be needed (as does alternative chamber designs of FIG. 1). Some example materials that may benefit from greater allowed imprecision are paper and cellulous, especially if the cylinder is entirely paper or cellulous cylinder other than the shot or membrane. In such a case where inexpensive but imprecise materials or manufacturing are desired, this allowance of imprecision permits a ratchet 214 (commonly moved by a "pawl" of the pressurized-air device), which is common to many cylinder designs, to be imprecise, soft, or otherwise of flexible design. While shown as the ratchet 214, various engagement structures allowing movement of the cylinder are contemplated, such as a non-rotating ratchet for a rectangular or belt-fed, non-cylindrical structure with multiple chambers or alternative pipes. Fabric or a friction region (shown at friction region 218 in FIG. 2) for moving the cylinder or other shot structure (e.g., alignment-insensitive shot rectangle 220) may also be used.

Example Self-Contained Shot Packages

Figure 3:
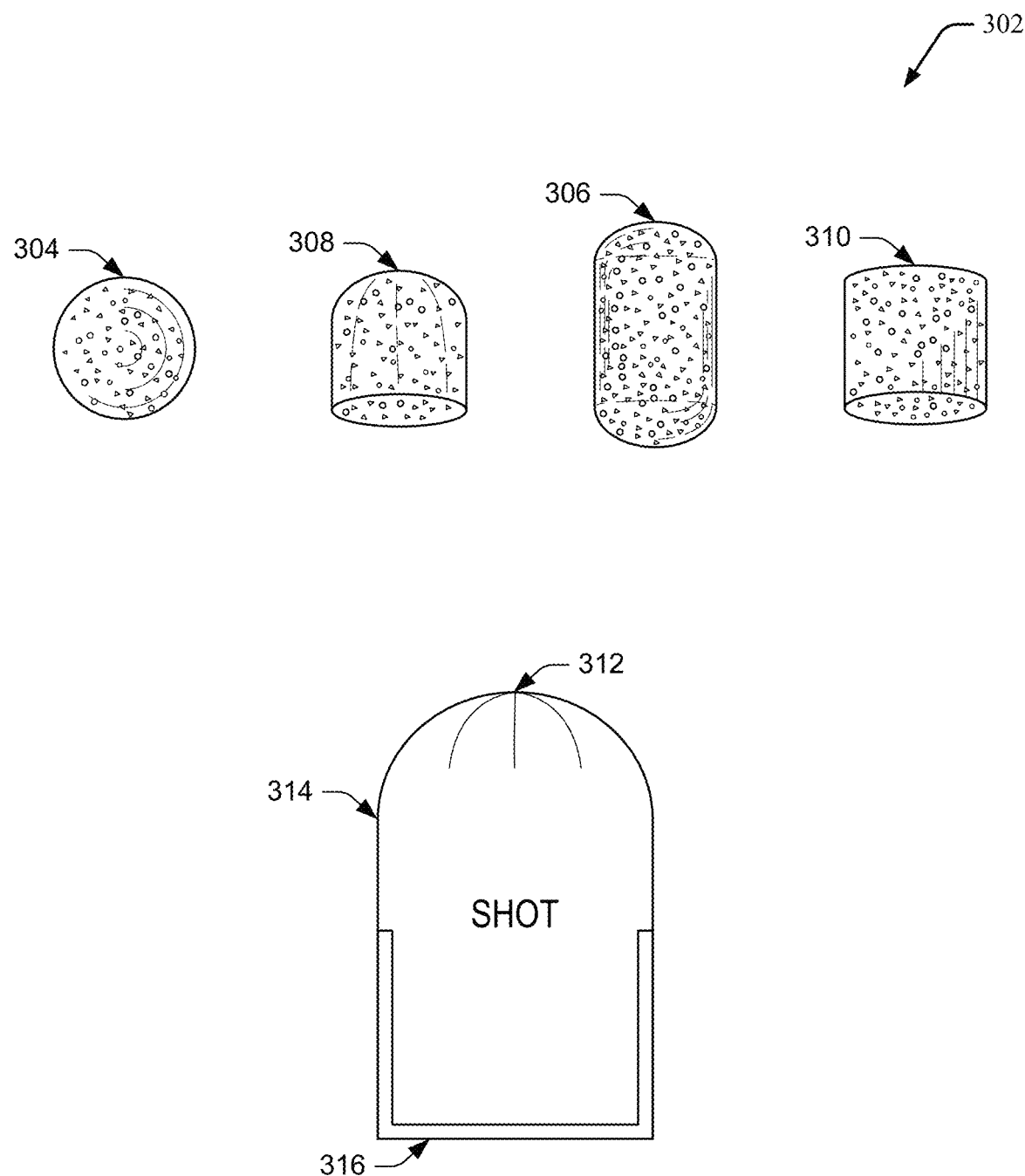
FIG. 3 illustrates various shot cartridges usable in repeating and non-repeating pressurized-air devices.

Another example is shown in FIG. 3, which is a self-contained shot package 302 suitable for use in a pressurized-air device. These can be inserted into a cylinder having chambers, such as shown with the cylinder 102 of FIG. 1, or can be inserted into other chambers, such as a break-barrel pellet rifle's chamber, a PCP rifle chamber, and so forth. Thus, cylinders with chambers or direct to chambers in barrels are both envisioned. In this example, the self-contained shot package 302 is of a material that, when subjected to pressurized air from one direction, forces the shot out of the package, either immediately, in the barrel, or at exit from the barrel. The material is strong enough to maintain the shot from falling out or breaking under use by a person's fingers and so forth, or being inserted into a chamber, but not so strong that the pressurized air is unable to break the material (or expand a front end to pass the shot through) and release the shot. In some cases, the material is light and therefore likely to be expelled from the shot device either on the shot or with a follow up. Further, the material is of a type not so hard as to damage the barrel of the pressurized-air device. Example materials include a thin paper formed into a ball 304, rounded cylinder 306, half-rounded cylinder 308, or cylinder 310, for example. Other materials, such as a thin plastic, cellophane, and so forth can be used. The self-contained shot package 302 may by symmetrical or asymmetrical and may have one end that is different than the other. Thus, one end may be flat and intended to be the end at which the air pressure is applied, with the other end rounded. This front end can be designed to be weaker or more-easily allow the shot to pass through it, such as with cuts or designed weakness 312 in the front end. This is shown at front end 314 and back end 316. The back end 316, in this asymmetrical case, can be intended to be strong enough to help push forward the shot without breaking, such as is currently done with an internal shot wad for current shotguns (e.g., 20 and 12 gauge gun-powder-powered weapons).

While the described pressurized-air device is described as a rifle or pistol, this is not required, as the pressurized-air device may use a smooth bore without or without a choked barrel. Further, for a pressurized-air device having a smooth bore, and thus intended for use with shot rather than a single projectile, a squeeze bore can also be used. A squeeze bore starts at a larger caliber at the point where the shot enters the barrel and then reduces caliber (diameter) over the course of the shot's travel down the barrel. This can be gradual or at the end of the barrel (aka, the muzzle). Furthermore, while the shot cylinders are described as a rotating implement, the techniques disclosed herein can be used with other types of multi-shot-enabling systems, such as a flexible "belt fed" system or a rectangular multi-chamber or shot-region having multiple potential regions of pipes with shot. Thus, a rectangular and linear multi-shot system lining up the chambers or pipe region along the air-to-barrel direction are contemplated. Movement may use a ratchet, but the structure would move linearly rather than rotationally.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. An alignment-insensitive shot structure for use with a repeating pressurized-air device, the alignment-insensitive shot structure comprising:

a multi-pipe region having multiple pipes, the multiple pipes each having multiple projectiles, three or more of the multiple pipes being smaller in combined cross-section than a diameter of a barrel of the repeating pressurized-air device in which the multiple projectiles are intended to be ejected;

a retention structure configured to permit the multiple projectiles to be ejected when subject to pressurized air and to be retained when not subject to the pressurized air; and an engagement structure, the engagement structure permitting movement of the alignment-insensitive shot structure effective to permit multiple sets of three or more of the multiple pipes to be progressively engaged by the pressurized air.

2. The alignment-insensitive shot structure of claim 1, wherein the alignment-insensitive shot structure is an alignment-insensitive shot cylinder and the engagement structure is a ratchet permitting rotation when engaged by a pawl of the repeating pressurized-air device.

3. The alignment-insensitive shot structure of claim 1, wherein the alignment-insensitive shot structure is an alignment-insensitive shot rectangle.

4. The alignment-insensitive shot structure of claim 3, wherein the engagement structure is a friction region permitting linear movement when engaged by the repeating pressurized-air device.

5. The alignment-insensitive shot structure of claim 1, wherein the retention structure is a mesh or membrane.

6. The alignment-insensitive shot structure of claim 1, wherein the engagement structure includes fabric or a belt structure.

7. The alignment-insensitive shot structure of claim 1, wherein the multiple projectiles are about 0.5 to 1.5 millimeter in size.

8. The alignment-insensitive shot structure of claim 1, wherein the multiple projectiles are Kosher or sea salt.

9. The alignment-insensitive shot structure of claim 1, wherein the multiple projectiles are tungsten or steel.

10. The alignment-insensitive shot structure of claim 1, wherein the alignment-insensitive shot structure is disposable and made of one or more of plastic, paper, or cellulose other than the multiple projectiles and the retention structure.

11. A repeating pressurized-air device comprising the alignment-insensitive shot structure of claim 1.

12. The repeating pressurized-air device of claim 11, wherein the repeating pressurized-air device comprises a barrel intake and a pressurized air intake region.

13. The repeating pressurized-air device of claim 12, wherein the barrel intake is larger in cross-section than the pressurized air intake region.

14. The repeating pressurized-air device of claim 11, wherein the repeating pressurized-air device is configured to provide pressurized air through a spring or gas piston.

15. The repeating pressurized-air device of claim 11, wherein the repeating pressurized-air device is configured to provide pressurized air through an electric-motor-powered spring-piston.

16. The repeating pressurized-air device of claim 11, wherein the repeating pressurized-air device is configured to provide pressurized air through a pre-charged pneumatic system.

17. The repeating pressurized-air device of claim 11, wherein the repeating pressurized-air device is configured to provide pressurized carbon dioxide through a disposable pressured CO2 cartridge.

* * * * *